US012251011B1

(12) United States Patent
Gendron

(10) Patent No.: US 12,251,011 B1
(45) Date of Patent: Mar. 18, 2025

(54) BRUSH SYSTEM

(71) Applicant: Patrick Gendron, Fort Myers, FL (US)

(72) Inventor: Patrick Gendron, Fort Myers, FL (US)

( * ) Notice: Subject to any disclaimer, the term of this patent is extended or adjusted under 35 U.S.C. 154(b) by 221 days.

(21) Appl. No.: 17/733,643

(22) Filed: Apr. 29, 2022

Related U.S. Application Data

(60) Provisional application No. 63/182,393, filed on Apr. 30, 2021.

(51) Int. Cl.

| | |
|---|---|
| ***A46B 5/00*** | (2006.01) |
| ***A46B 11/06*** | (2006.01) |
| ***A46B 13/04*** | (2006.01) |
| ***A46B 13/06*** | (2006.01) |
| ***B05B 12/00*** | (2018.01) |
| ***B05B 15/65*** | (2018.01) |

(52) U.S. Cl.
CPC ............ *A46B 13/06* (2013.01); *A46B 5/0095* (2013.01); *A46B 11/063* (2013.01); *A46B 13/04* (2013.01); *B05B 12/00* (2013.01); *B05B 15/65* (2018.02)

(58) Field of Classification Search
CPC ..... A46B 5/0095; A46B 11/06; A46B 11/063; A46B 11/066; A46B 13/04; A46B 13/06; A46B 2200/3033; A47L 17/00; A47L 17/04; E03C 1/02; E03C 1/021; E03C 1/04; E03C 1/046; E03C 2001/0415; E03C 2001/0417; Y10T 137/6918; Y10T 137/6954; B05B 15/625; B05B 15/628; B05B 15/65; B05B 15/658; B05B 1/12; B05B 1/16; B05B 12/00; B05B 12/02; B05B 12/06
USPC ......... 239/289, 525, 530, 532, 581.1, 581.2; 285/305
See application file for complete search history.

(56) References Cited

U.S. PATENT DOCUMENTS

| | | | | |
|---|---|---|---|---|
| 2,266,902 | A | 12/1941 | Perkins | |
| 2,590,353 | A | 3/1952 | Schaar et al. | |
| 2,629,630 | A * | 2/1953 | Roark | B65H 75/4402 242/378 |
| 2,887,121 | A | 5/1959 | Magee | |
| 3,070,826 | A | 1/1963 | Paterno | |
| 3,966,359 | A | 6/1976 | Woog | |
| 4,126,401 | A | 11/1978 | Stoyshin | |

(Continued)

FOREIGN PATENT DOCUMENTS

WO WO-2018148035 A1 * 8/2018 ........... B65H 75/364

*Primary Examiner* — Randall E Chin
(74) *Attorney, Agent, or Firm* — John Rizvi; John Rizvi, P.A.—The Patent Professor®

(57) ABSTRACT

A brush system having a storable hose and multiple brushes which can be interchangeably attached to the hose depending on the desired spray characteristics. A hose spool is disposed for rotation in the hose housing, and a spray hose is stored on the hose spool. A brush coupling assembly terminates at a distal end of the spray hose. Various brushes of different design are interchangeably attachable to the brush coupling assembly. A flow control valve is connected to the spray hose through a supply hose. The flow control valve is connected to a source of pressurized water through a source hose. Accordingly, pressurized water may be supplied to the brush through the source hose, flow control valve, supply hose, spray hose and brush coupling assembly, respectively. A water spray is discharged from the brush onto an item to be cleaned.

19 Claims, 6 Drawing Sheets

(56) References Cited

U.S. PATENT DOCUMENTS

| | | | | |
|---|---|---|---|---|
| 5,782,412 | A * | 7/1998 | Plantz | B65H 75/4478 137/355.2 |
| 5,906,319 | A | 5/1999 | Crowl | |
| 5,960,503 | A * | 10/1999 | Del Pozo Y Mattei | B01F 25/316 15/97.1 |
| 5,988,911 | A | 12/1999 | Browne, Jr. et al. | |
| 6,000,626 | A | 12/1999 | Futo et al. | |
| 6,035,477 | A | 3/2000 | Robert | |
| 6,602,010 | B1 | 8/2003 | Doyle et al. | |
| 6,691,930 | B2 * | 2/2004 | Lu | B65H 75/4471 239/526 |
| 6,834,813 | B1 * | 12/2004 | Nobi | B65H 75/4434 137/355.16 |
| 7,001,095 | B1 | 2/2006 | Chen | |
| 7,127,750 | B2 | 10/2006 | Lim | |
| 7,143,460 | B1 * | 12/2006 | Kato | A46B 13/04 15/29 |
| 7,565,713 | B2 | 7/2009 | Standish | |
| 7,921,871 | B2 * | 4/2011 | Lawrence | B65H 75/4492 137/355.16 |
| 8,281,423 | B2 | 10/2012 | Taylor et al. | |
| 8,342,768 | B1 | 1/2013 | Johnston et al. | |
| 9,474,360 | B2 | 10/2016 | Alsalameh | |
| 9,643,195 | B2 | 5/2017 | Streetmaker | |
| 10,428,506 | B1 | 10/2019 | Osbrach | |
| 2004/0149608 | A1 | 8/2004 | Laux et al. | |
| 2004/0177868 | A1 | 9/2004 | Kim | |
| 2005/0229300 | A1 | 10/2005 | Wilcox | |
| 2006/0130250 | A1 | 6/2006 | Gaiti | |
| 2006/0181181 | A1 | 8/2006 | Calfee et al. | |
| 2007/0071542 | A1 | 3/2007 | Cicero | |
| 2008/0229529 | A1 | 9/2008 | Viner | |
| 2010/0270402 | A1 * | 10/2010 | Gilpatrick | B08B 3/028 239/590.3 |
| 2011/0085845 | A1 | 4/2011 | Cutler | |
| 2012/0006431 | A1 * | 1/2012 | Gilpatrick | B05B 1/1654 137/565.01 |
| 2013/0133702 | A1 | 5/2013 | Reid et al. | |
| 2017/0105515 | A1 | 4/2017 | Marti | |
| 2019/0060919 | A1 | 2/2019 | Daru | |
| 2020/0138182 | A1 | 5/2020 | Busch | |

* cited by examiner

BRUSH SYSTEM

CROSS-REFERENCE TO RELATED APPLICATIONS

This application claims the benefit of U.S. Provisional Patent Application Ser. No. 63/182,393 filed on Apr. 30, 2021, which is incorporated by reference herein in its entirety.

FIELD OF THE INVENTION

The present invention relates generally to brushes, and more particularly, to a brush system having a storable hose and multiple brushes of different design which can be interchangeably attached to the hose depending on the desired spray characteristics.

BACKGROUND OF THE INVENTION

The advent of flatware has necessitated a simple and efficient way for cleaning. Early techniques for cleaning flatware included the use of dish towels, sponges, rags, brushes, steel wool and the like. The automatic dishwasher has eliminated many of the problems encountered in cleaning dishes.

Automatic dishwashers may have drawbacks for some applications. For example, automatic dishwashers are expensive and cannot easily be installed in many older homes or apartments without major structural modification of the kitchen area. Some types of food preparation and serving items such as electric frying devices, for example, cannot be cleaned using an automatic dishwasher.

Sponges and handheld cleaning brushes are commonly used to clean flatware and other food preparation items. Conventional sponges and cleaning brushes, however, typically require that a user hold the item which is being cleaned with one hand and the sponge or brush with the other. While a water spraying nozzle may be used in conjunction with the sponge or brush, however, it may be difficult or impossible for the cleaner to simultaneously hold both the sponge or brush and the water spraying nozzle in an effective manner.

In some applications, a conventional water spraying nozzle may be attached to a hose connected to a water supply on one side of a sink. The user may grasp the nozzle with one hand while grasping a sponge or cleaning brush with the other hand to clean the item. This arrangement, however, may be cumbersome since the nozzle and the sponge or cleaning brush may need to be juggled from hand to hand.

Accordingly, there is need for a brush system having a storable hose and multiple brushes of different design which can be interchangeably attached to the hose depending on the desired spray characteristics.

SUMMARY OF THE INVENTION

The present invention is directed to a brush system having a storable hose and multiple brushes of different design which can be interchangeably attached to the hose depending on the desired spray characteristics. An illustrative embodiment of the brush system may include a hose housing. A hose spool may be disposed for rotation in the hose housing. A spray hose may be wound on the hose spool. A source of pressurized water may be disposed in fluid communication with the spray hose. A brush coupling assembly may terminate the extending distal end of the spray hose. Various brushes of different design may be interchangeably attached to the brush coupling assembly. Accordingly, pressurized water may be supplied to the brush through the spray hose and brush coupling assembly, respectively. A water spray may be discharged from the brush against an item to be cleaned. In alternative embodiments, the hose housing may be omitted and the spray hose may be dispensed from a counter or other enclosure or support.

In an illustrative implementation of the invention, a brush system having a storable hose and multiple brushes of different design which can be interchangeably attached to the hose depending on the desired spray characteristics may include a hose housing. A hose spool may be disposed for rotation in the hose housing. A spray hose may be wound on the hose spool. A brush coupling assembly may terminate the extending distal end of the spray hose. Various brushes of different design may be interchangeably attached to the brush coupling assembly. A flow control valve may be connected to the spray hose through a supply hose. The flow control valve may be connected to a source of pressurized water through a source hose. Accordingly, pressurized water may be supplied to the brush through the source hose, flow control valve, supply hose, spray hose and brush coupling assembly, respectively. A water spray may be discharged from the brush against an item to be cleaned.

In a second aspect, the hose housing may include a lower housing panel, a pair of side housing panels, an upper housing panel, a rear housing panel, a front housing panel and a housing interior, and the hose spool may be disposed for rotation in the housing interior.

In another aspect, a hose spool support may be provided in the housing interior of the hose housing, and the hose spool may be supported for rotation by the hose spool support.

In another aspect, the hose spool support may include a rear support member and a front support member disposed in spaced-apart relationship to the rear support member. The hose spool may be journaled for rotation between the rear support member and the front support member of the hose spool support.

In another aspect, the hose spool may include a rear spool flange, a front spool flange disposed in spaced-apart relationship to the rear spool flange, a spool body extending between the rear spool flange and the front spool flange and a spool mount shaft extending from the spool body.

In another aspect, a rear shaft bearing and a front shaft bearing may rotatably mount the hose spool on the rear support member and the front support member, respectively, of the hose spool support.

In another aspect, a rear shaft bearing may mount the spool mount shaft on the rear support member of the hose spool support.

In another aspect, a hose connecting conduit may be disposed in fluid communication with the spray hose and the supply hose.

In another aspect, the hose connecting conduit may extend through the front housing panel of the hose housing.

In another aspect, a hose coupling may be provided on the hose connecting conduit, and the supply hose may be connectable to the hose coupling.

In another aspect, a home station arm may extend from the hose housing, and the spray hose may extend from the housing interior of the hose housing through the home station arm.

In another aspect, the brush coupling assembly may include a typically knob-controllable shutoff valve on the distal or extending end of the spray hose, a coupling socket disposed in fluid communication with the shutoff valve, a socket cup disposed in the coupling socket and at least one socket opening extending through the socket cup, and each brush may be configured for releasable attachment to the coupling socket.

In another aspect, each brush may include a brush handle, a spray head on the brush handle and a brush coupling extending from the brush handle, and the brush coupling may be configured to connect with the coupling socket of the brush coupling assembly.

In another aspect, a brush release button may be provided on the brush handle of each brush to facilitate selective release and detachment of the brush from the brush coupling assembly.

In another aspect, the interchangeable brushes may include a scrub brush.

In another aspect, the interchangeable brushes may include a bottle brush.

In another aspect, the scrub brush may include a plurality of brush bristles extending from the spray head.

In another aspect, a spray concentrator may be deployable in place on the spray head to concentrate the spray discharged from the spray head.

In another aspect, the bottle brush may include a brush opening in the brush head.

In another aspect, a spray control button may be provided on the spray head of the scrub brush to control the flaccid or forceful discharge of spray from the spray head.

In another aspect, the flow control valve may be fitted with a valve handle.

In another aspect, the flow control valve may include a hose fitting, and the source hose and the supply hose may be connected to the hose fitting.

These and other objects, features, and advantages of the present invention will become more readily apparent from the attached drawings and the detailed description of the preferred embodiments, which follow.

BRIEF DESCRIPTION OF THE DRAWINGS

Various illustrative embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a brush system having a storable hose and multiple brushes of different design which can be interchangeably attached to the hose depending on the desired spray characteristics.

Referring initially to FIGS. 1 through 7A, a brush system 100 is illustrated in accordance with an exemplary embodiment of the present invention. As shown for instance in FIGS. 2 and 3, the brush system 100 may include a hose housing 102. A hose spool 132 may be disposed for rotation in the hose housing 102. A spray hose 154 may be wound on the hose spool 132. A source of pressurized water (not illustrated) may be disposed in fluid communication with the spray hose 154, as will be hereinafter described. In some embodiments, the hose spool 132 may be spring-loaded in the direction in which the spray hose 154 is wound onto the hose spool 132. Accordingly, the spring-loaded hose spool 132 may normally maintain the spray hose 154 in a wound configuration on the hose spool 132. In alternative embodiments, the hose housing 102 may be omitted. The spray hose 154 may be dispensed from a counter or other enclosure or support.

Figure 4:
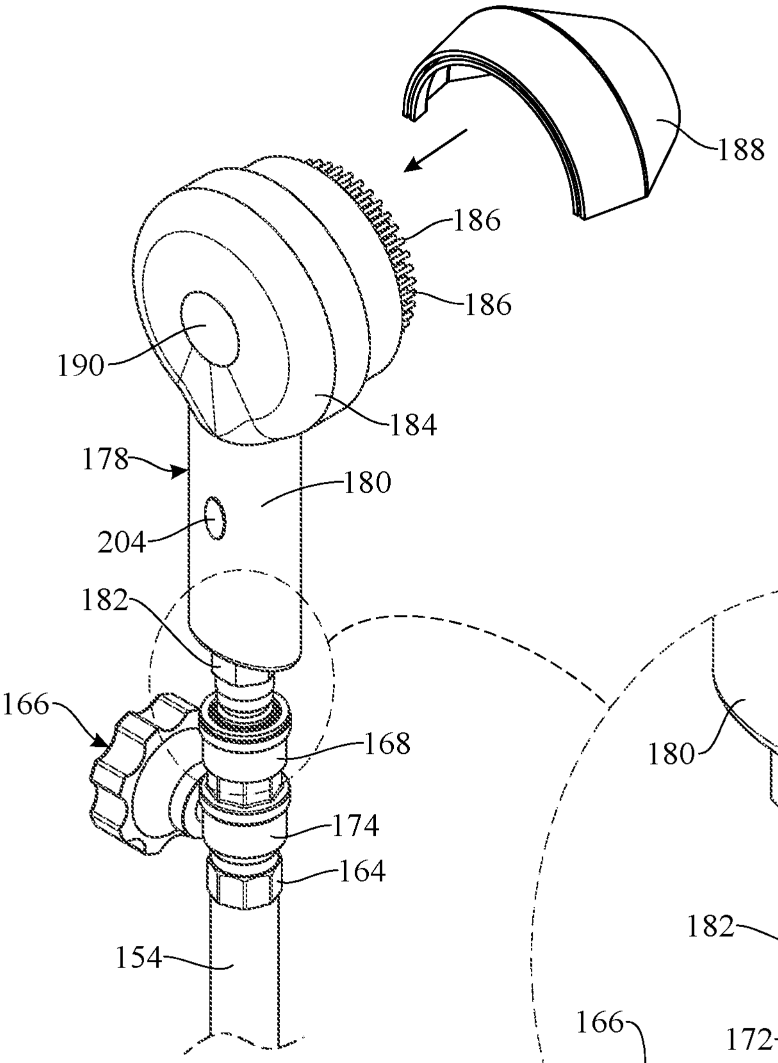
FIG. 4 presents a perspective view of a scrub brush of the illustrative brush system, more particularly illustrating attachment of a spray concentrator to a spray head of the scrub brush.
Figure 5:
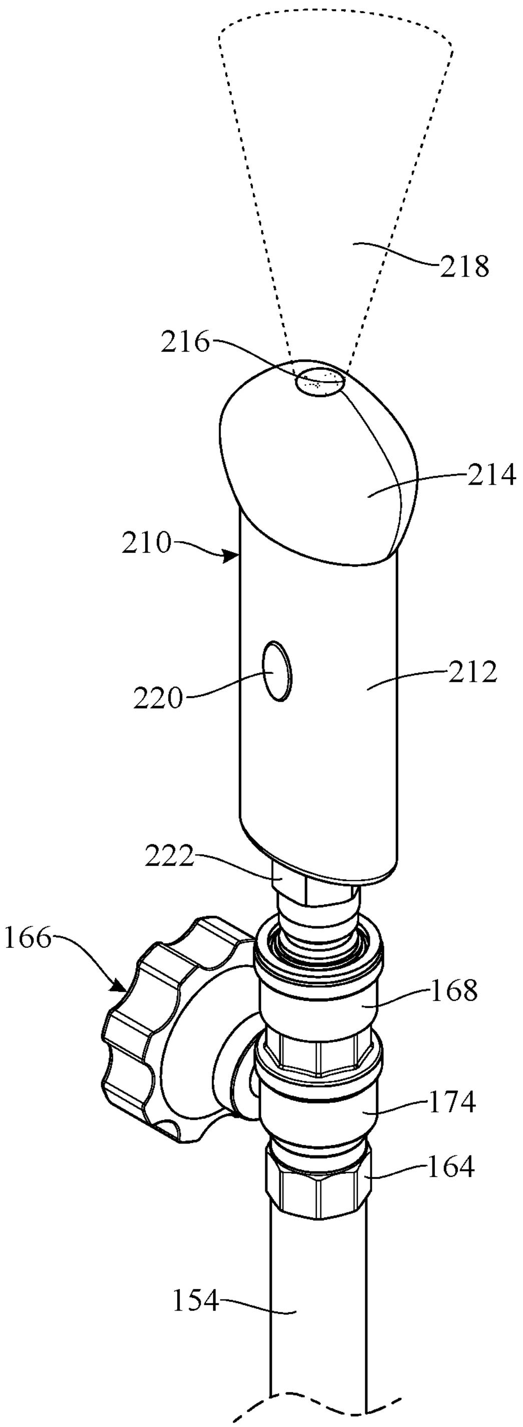
FIG. 5 presents a perspective view of a brush coupling assembly, with a bottle brush attached to the brush coupling assembly and a conical water spray discharged from the bottle brush of the brush system.

A brush coupling assembly 166 may terminate the extending distal end of the spray hose 154. As illustrated in FIGS. 4 and 5, various brushes 178, 210 of different design may be interchangeably attached to the brush coupling assembly 166. Accordingly, pressurized water may be supplied to the brush 178, 210 through the spray hose 154 and brush coupling assembly 166, respectively. A water spray 176, 218 may be discharged from the brush 178, 210 against an item to be cleaned.

Figure 1:
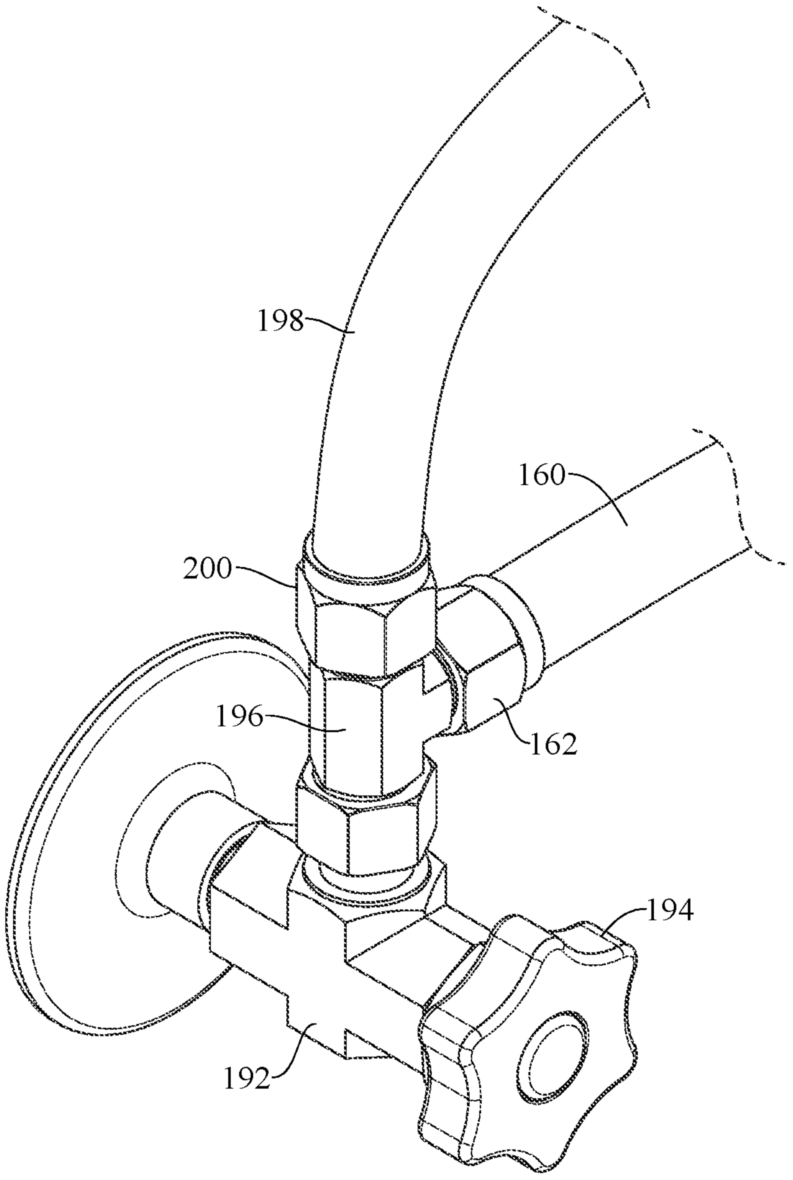
FIG. 1 presents a perspective view of a flow control valve and hose fitting in accordance with an illustrative embodiment of a brush system in accordance with the present invention, with a source hose and a supply hose connected to the hose fitting.

As illustrated in FIG. 1, a flow control valve 192 may be connected to the spray hose 154 through a supply hose 160. The flow control valve 192 may be connected to a source of pressurized water through a source hose 198. Accordingly, pressurized water may be supplied to the brush 178, 210 through the source hose 198, flow control valve 192, supply hose 160, spray hose 154 and brush coupling assembly 166, respectively.

In some embodiments, the flow control valve 192 may be fitted with a valve handle 194. The valve handle 194 may facilitate selective opening and closing of the flow control valve 192. The flow control valve 192 may include a hose fitting 196. Accordingly, the source hose 198 and the supply hose 160 may be connected to the hose fitting 196.

As further illustrated in FIG. 1, a proximal hose coupling 162 may be provided on the on the supply hose 160 to facilitate coupling of the supply hose 160 to the hose fitting 196. A source hose coupling 200 may be provided on the source hose 198 to facilitate coupling of the source hose 198 to the hose fitting 196.

Figure 2:
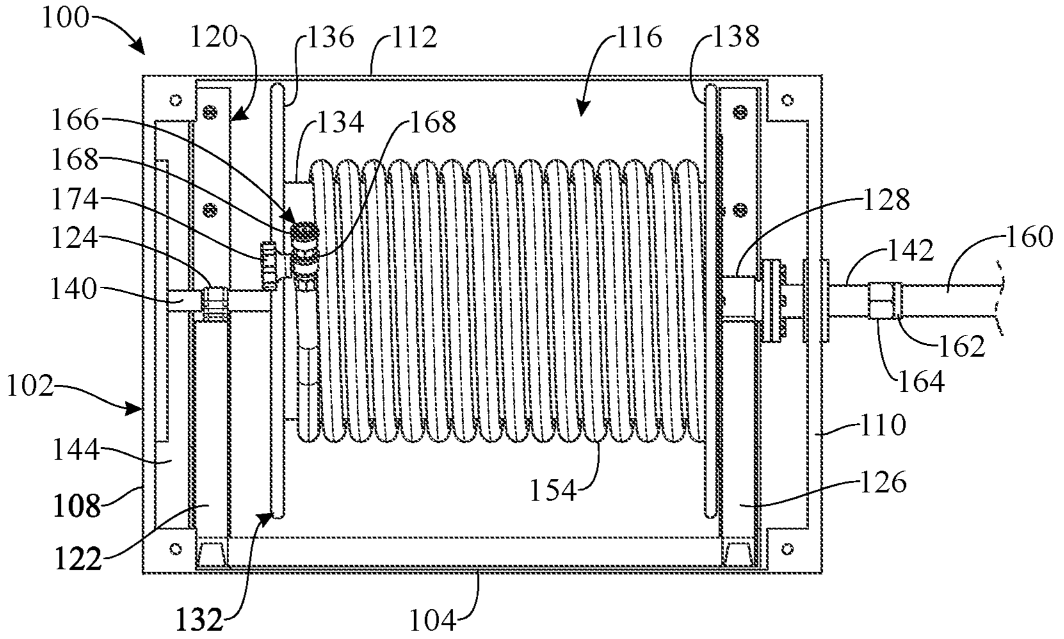
FIG. 2 presents a sectional side view of a hose housing of the illustrative brush system.
Figure 3:
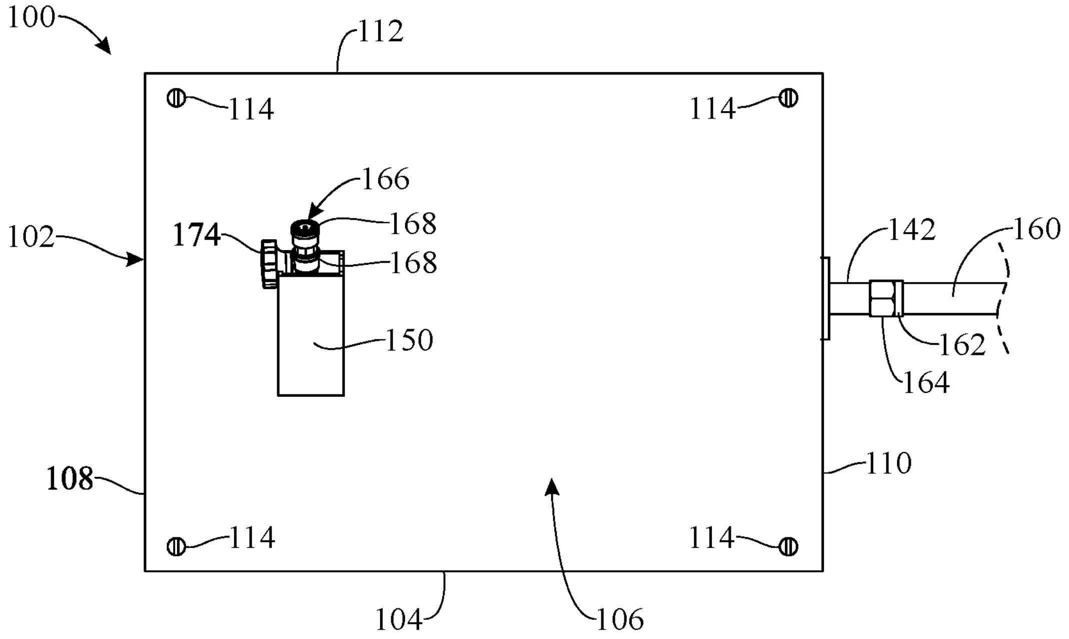
FIG. 3 presents a side view of the hose housing of FIG. 2.

As illustrated in FIGS. 2 and 3, in some embodiments, the hose housing 102 may include a lower housing panel 104. A pair of spaced-apart side housing panels 106, a rear housing panel 108 and a front housing panel 110 may extend from the lower housing panel 104. An upper housing panel 112 may be supported by the side housing panels 106, the rear housing panel 108 and the front housing panel 110. As illustrated in FIG. 2, a housing interior 116 may be formed by and between the lower housing panel 104, the side housing panels 106, the rear housing panel 108, the front housing panel 110 and the upper housing panel 112. The hose spool 132 may be disposed for rotation in the housing interior 116 as will be hereinafter described.

As will be appreciated, the lower housing panel 104, the side housing panels 106, the rear housing panel 108, the front housing panel 110 and the upper housing panel 112 may be secured to one another to form the assembled hose housing 102. As illustrated in FIG. 3, in some embodiments, panel fasteners 114 may be used for the purpose. In other embodiments, other techniques including brackets and/or welding, for example and without limitation, may attach the lower housing panel 104, the side housing panels 106, the rear housing panel 108, the front housing panel 110 and the upper housing panel 112 in the hose housing 102.

As further illustrated in FIG. 2, in some embodiments, a hose spool support 120 may be provided in the housing interior 116 of the hose housing 102. The hose spool 132 may be supported for rotation by the hose spool support 120. Accordingly, the hose spool support 120 may include a rear support member 122. A front support member 126 may be disposed in spaced-apart relationship to the rear support member 122. The hose spool 132 may be journaled for rotation between the rear support member 122 and the front support member 126 of the hose spool support 120.

The hose spool 132 may include a rear spool flange 136. A front spool flange 138 may be disposed in a spaced-apart relationship to the rear spool flange 136. A spool body 134 may extend between the rear spool flange 136 and the front spool flange 138. In some embodiments, the spool body 134 may be cylindrical. The spray hose 154 may be wound on the spool body 134.

The hose spool 132 may be mounted or journaled for rotation on the hose spool support 120. In some embodiments, a spool mount shaft 140 may extend rearwardly from the spool body 134. A rear shaft bearing 124 may rotatably mount the spool mount shaft 140 on the rear support member 122 of the hose spool support 120. A front shaft bearing 128 may mount the spool body 134 on the front support member 126 of the hose spool support 120.

In some embodiments, a spool rotation wheel 144 may drivingly engage the spool mount shaft 140. The spool rotation wheel 144 may be exposed through a wheel opening (not illustrated) in the rear housing panel 108 of the hose housing 102. The spool rotation wheel 144 may facilitate rotation of the hose spool 132 through the spool mount shaft 140 and winding or unwinding of the spray hose 154 with respect to the hose spool 132. A wheel engagement device such as a handle, dimples, or the like may be provided on or in the spool rotation wheel 144 to enable a user to manually rotate the spool rotation wheel 144 and the hose spool 132.

A hose connecting conduit 142 may be disposed in fluid communication with the spray hose 154 and the supply hose 160, for example, via a distal hose coupling 164. The hose connecting conduit 142 may extend through a conduit opening in the front housing panel 110 of the hose housing 102. A distal hose coupling 164 may connect the supply hose 160 to the hose connecting conduit 142.

As illustrated in FIG. 3, a home station arm 150 may extend from the hose housing 102. In some embodiments, the home station arm 150 may extend from one of the side housing panels 106 of the hose housing 102, as illustrated. The spray hose 154 may extend from the housing interior 116, as shown in FIG. 2, of the hose housing 102 through the home station arm 150, as shown in FIG. 3. Accordingly, the home station arm 150 may normally maintain the spray hose 154 in the wound configuration on the hose spool 132 and the brush coupling assembly 166 in place to ensure that the brush 178, 210 remains off when not in use.

Figure 4A:
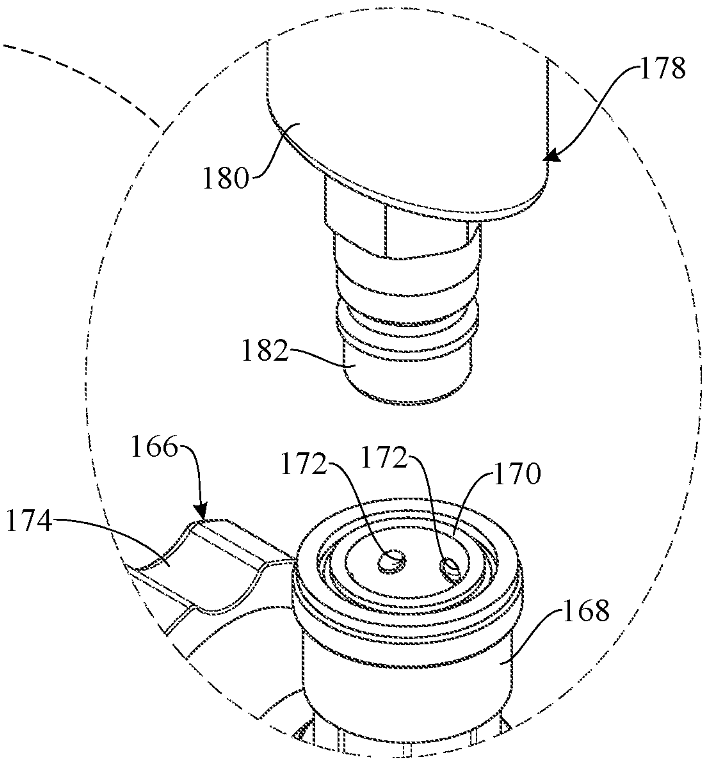
FIG. 4A presents an enlarged exploded sectional view of the inset in FIG. 4, more particularly illustrating coupling of the scrub brush to the brush coupling assembly.

As illustrated in FIGS. 4 through 7A, in some embodiments, the brush coupling assembly 166 may include a knob-controllable shutoff valve 174 on the distal or extending end of the spray hose 154. A coupling socket 168 may be disposed in fluid communication with the shutoff valve 174 As illustrated in FIG. 4A, a socket cup 170 may be disposed in the coupling socket 168. At least one socket opening 172 may extend through the socket cup 170. The brush 178 may be configured for releasable attachment to the coupling socket 168, as is hereinafter described.

As illustrated in FIGS. 5 through 7A, in some embodiments, the interchangeable brushes 178, 210 may include a scrub brush 178. In some embodiments, the interchangeable brushes 178, 210 may include a bottle brush 210. In other embodiments, the interchangeable brushes may have other designs depending on the desired application of the brush system 100. For example and without limitation, in some embodiments, the brush may comprise a sponge construction.

In some embodiments, each brush 178, 210 may include a surrounding splash guard to prevent water from splashing when the brush 178, 210 is placed in the splash guard when not in use.

Figure 6:
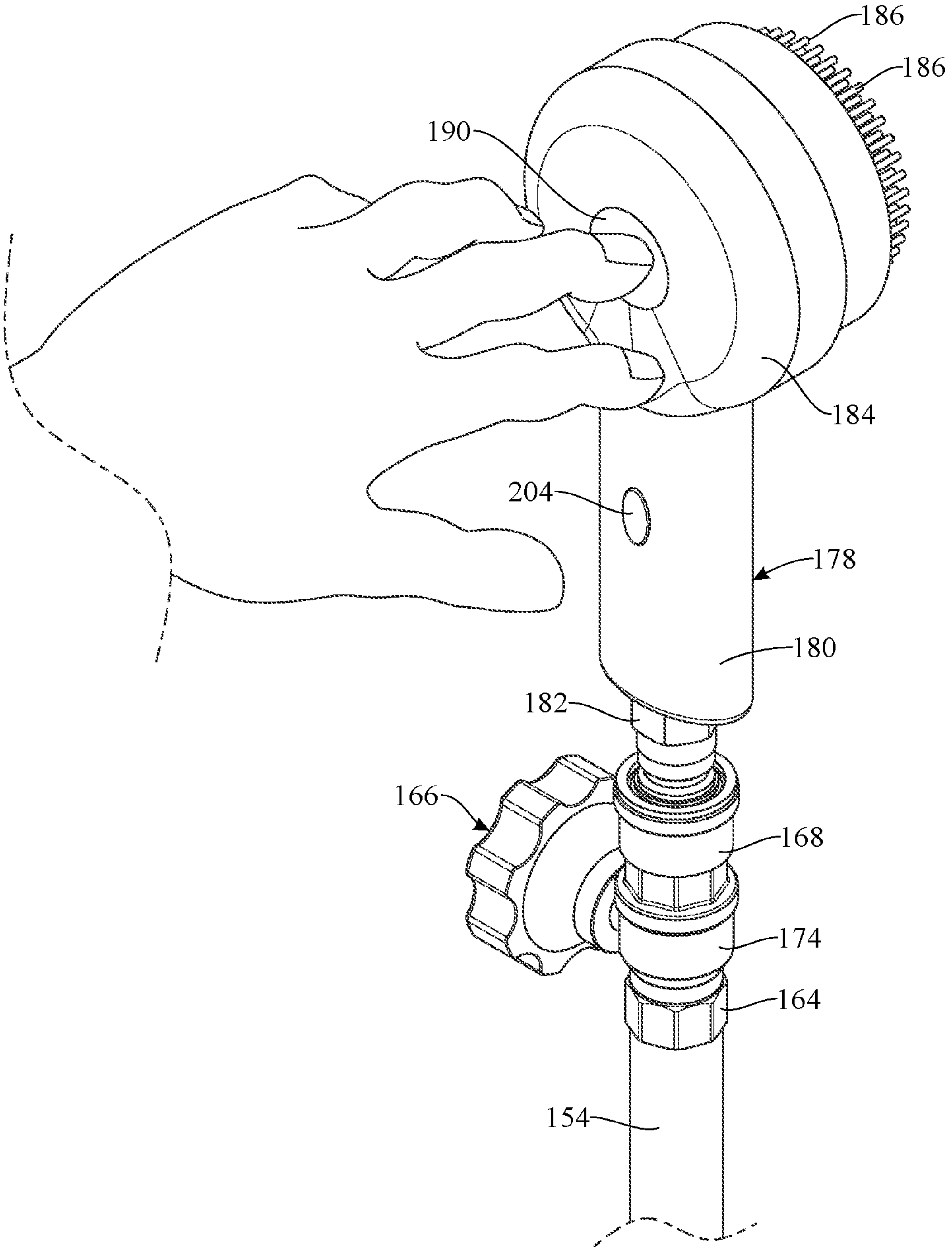
FIG. 6 presents a perspective view of a brush coupling assembly with a scrub brush attached to the brush coupling assembly, more particularly illustrating a user depressing a spray control button on a spray head of the scrub brush to control or adjust the spray characteristics of spray discharged from the scrub brush.

As illustrated in FIGS. 4 and 6, in some embodiments, the scrub brush 178 may include a brush handle 180. A brush coupling 182 may extend from the proximal end of the brush handle 180. In some embodiments, the brush coupling 182 may include a quick release connector. Accordingly, the brush coupling 182 may be sized and configured for insertion into and connection with the coupling socket 168 of the brush coupling assembly 166.

A spray head 184 may terminate the extending or distal end of the brush handle 180. At least one, and typically, multiple spray openings may discharge through the face of the spray head 184. The spray openings may be disposed in fluid communication with the spray hose 154 through the distal hose coupling 164, the shutoff valve 174, the coupling socket 168, the brush handle 180 and the spray head 184, respectively. A plurality of brush bristles 186 may extend from the face of the spray head 184 adjacent to the spray openings.

In some embodiments, a spray control button 190 may be provided on the spray head 184 of the scrub brush 178. The spray control button 190 may be configured to dispense a flaccid discharge of water spray 176 from the spray head 184, as shown by way of example in FIG. 7, or a forceful discharge of water spray 176 from the spray head 184, as is shown by way of example in FIG. 7A.

As illustrated in FIG. 4, in some embodiments, a spray concentrator 188 may be deployable in place on the spray head 184. The spray concentrator 188 may be configured to concentrate the water spray 176 discharged from the spray head 184. The spray concentrator 188 may be detachably attachable to the spray head 184, such as via a friction fit.

As illustrated in FIG. 5, in some embodiments, the bottle brush 210 may include a brush handle 212. A brush coupling 222 may extend from the proximal end of the brush handle 212. In some embodiments, the brush coupling 222 may include a quick release connector. Accordingly, the brush coupling 222 may be sized and configured for insertion into and connection with the coupling socket 168 of the brush coupling assembly 166.

A bulbous brush head 214 may terminate on the extending or distal end of the brush handle 212. The brush head 214 may be configured for insertion into a bottle for washing of the bottle interior. A brush opening 216 may be provided in the brush head 214. The brush opening 216 may be disposed in fluid communication with the spray hose 154 through the distal hose coupling 164, the shutoff valve 174, the coupling socket 168 and the brush coupling 222, respectively. Accordingly, the bottle brush 210 may be configured to discharge a conical water spray 218 from the brush head 214 through the brush opening 216 in at least one application of the brush system 100, described hereinafter.

In a typical application of the brush system 100, the source hose 198 may be coupled to the hose fitting 196 of the flow control valve 192 via the source hose coupling 200. The supply hose 160 may be coupled to the hose coupling 196 of the flow control valve 192 via the proximal hose coupling 162, as shown in FIG. 1, and to the hose connecting conduit 142 via the distal hose coupling 164, as shown in FIG. 2.

The selected length of the spray hose 154 may be extended from the hose spool 132 typically by pulling the spray hose 154 through the home station arm 150. The scrub brush 178 or the bottle brush 210 may be attached to the brush coupling assembly 166, as was heretofore described with respect to FIG. 4A.

Figure 7:
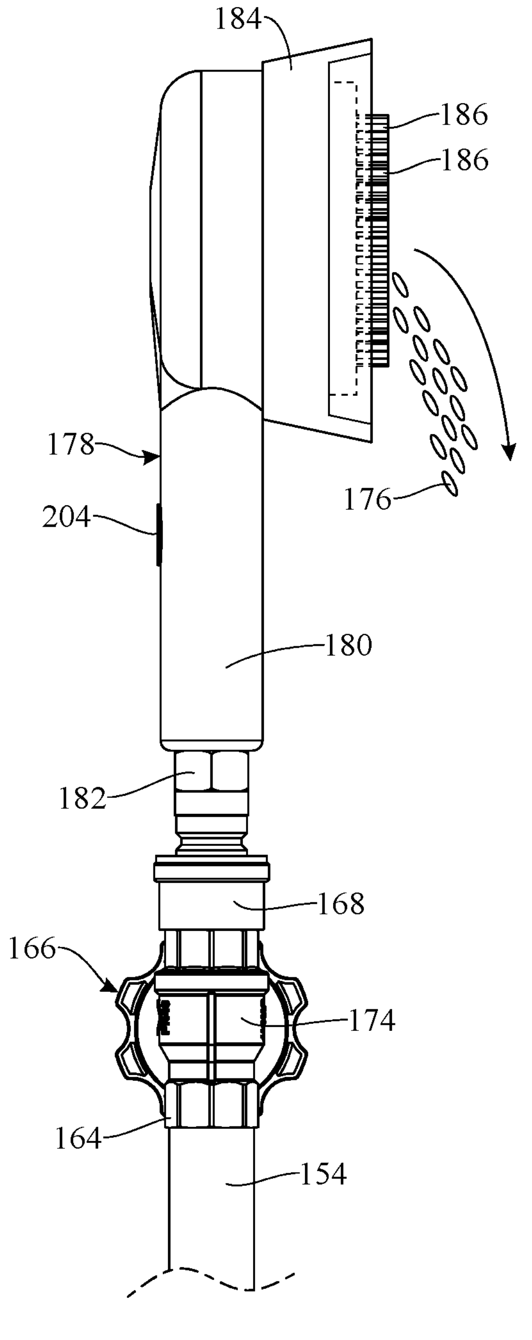
FIG. 7 presents a side elevation of a scrub brush, illustrating controlled flaccid discharge of water spray from a spray head.
Figure 7A:
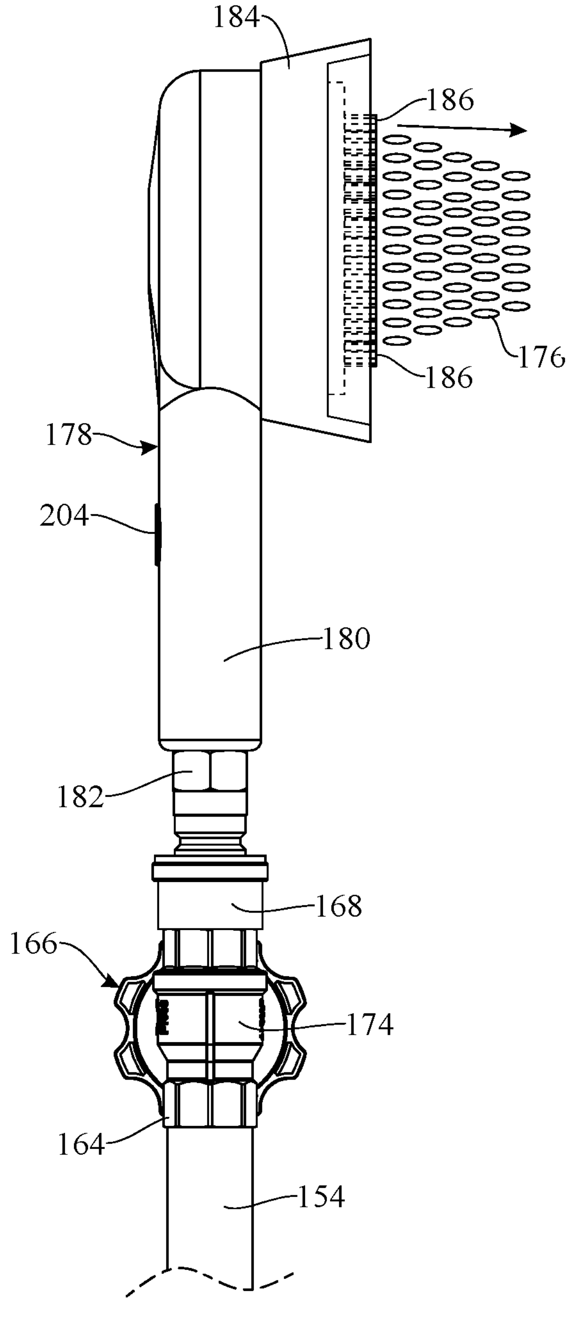
FIG. 7A presents a side elevation of the scrub brush, illustrating controlled forceful discharge of water spray from a spray head.

The flow control valve 192 may be opened, typically by rotating the valve handle 194, to distribute water from the source of pressurized water through the open flow control valve 192, the supply hose 160, the hose connecting conduit 142 and the spray hose 154, respectively. The shutoff valve 174 of the brush coupling assembly 166 may be opened to facilitate flow of the pressurized water from the spray hose 154 through the brush coupling assembly 164 and the brush handle 180 of the brush 184, respectively. As illustrated in FIGS. 7 and 7A, water may be discharged as a water spray 176 through the spray openings in the spray head 184 of the scrub brush 178. The brush bristles 186 of the scrub brush 178 may be applied against the surface to be cleaned as the water spray 176 is discharged from the spray head 184.

It will be appreciated by those skilled in the art that the spray characteristics of the scrub brush 178 can be selectively adjusted to achieve a flaccid discharge of the water spray 176 from the spray head 184, once again, as shown in FIG. 7, or a forceful discharge of the water spray 176 from the spray head 184, as best shown in FIG. 7A. The shutoff valve 174 can be selectively adjusted between the open and closed valve positions to additionally control the force of the water spray 176. In some applications, the spray concentrator 188 may be deployed in place on the spray head 184 to concentrate the water spray 176 into a narrower stream. The scrub brush 178 may be selectively detached and removed from the coupling socket 168 of the brush coupling assembly 166. The spray hose 154 may be recoiled back onto the hose spool 132 as the hose spool 132 rotates in the housing interior 116.

As illustrated in FIG. 5, in some applications, the bottle brush 210 may be attached to the brush coupling assembly 166 via coupling socket 168. The pressurized water may be discharged from the brush head 214 of the bottle brush 210 through the brush opening 216 as a conical water spray 218. After use, the bottle brush 210 may be detached and removed from the brush coupling assembly 166.

Referring again to FIGS. 4 and 5, in some embodiments, a shutoff valve may be provided in the brush handle 180 of the scrub brush 178. The shutoff valve may be configured to block discharge of the water spray 176 from the spray head 184 when actuated. The shutoff valve may be selectively actuatable by manipulation of a button, switch or other control feature 204 on the brush handle 180. The brush handle 212 of the bottle brush 210 may in like manner be provided with the shutoff valve, with a shutoff valve button 220.

In some embodiments, the shutoff valve in the brush handle 180, 212 may be pressure actuated. Upon applying pressure of the brush head 184, 214 to the item being cleaned, the shutoff valve may open to permit flow of the water through the brush handle 180, 212 and discharge of the water spray 176, 218 from the brush head 184, 214, respectively. Conversely, upon release of the brush head 184, 214 from the item, the shutoff valve may close to prevent flow of the water through the brush handle 180, 212 and discharge of the water spray 176, 218 through the brush head 184, 214, respectively.

In some embodiments, the brush handle 180 of the scrub brush 178 or the brush handle 212 of the bottle brush 210 may include an opening or port which facilitates introduction of a cleaning solution into the flow of the water through the brush handle 180, 212. This feature may facilitate mixture of the cleaning solution with the water and discharge of the water and cleaning solution in the water spray 176, 218 in the cleaning of dishes or other flatware or silverware, for example and without limitation.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A brush system operable with a pressurized water supply comprising:

a hose housing;

a hose spool mounted in a rotational disposition in said hose housing;

a spray hose storable in a wound disposition on said hose spool;

a brush coupling assembly disposed in fluid communication with one end of said spray hose, wherein said brush coupling assembly includes a shutoff valve on a distal end of said spray hose, a coupling socket disposed in fluid communication with said shutoff valve, a socket cup disposed in said coupling socket and at least one socket opening extending through said socket cup, said at least one brush configured for releasable attachment via said coupling socket;

at least one brush removably attachable to said brush coupling assembly; and a flow control valve disposed in fluid communication with an opposite end of said spray hose and the pressurized water supply.

2. The brush system as recited in claim 1, wherein said hose housing includes a lower housing panel, a pair of side housing panels, an upper housing panel, a rear housing panel and a front housing panel cooperatively at least partially defining a housing interior, wherein said hose spool is mounted in said rotational disposition in said housing interior.

3. The brush system as recited in claim 2, further comprising a hose spool support disposed in said housing interior of said hose housing, said hose spool supported in a rotational disposition by said hose spool support.

4. The brush system as recited in claim 3, wherein said hose spool support includes a rear support member and a front support member disposed in a spaced apart relationship to one another, said hose spool being journaled for rotation between said rear support member and said front support member of said hose spool support.

5. The brush system as recited in claim 4, wherein said hose spool includes a rear spool flange and a front spool flange disposed in spaced-apart relationship to one another, and a spool body extending between said rear spool flange and said front spool flange, wherein said spray hose is storable in said wound disposition on said spool body.

6. The brush system as recited in claim 2, further comprising a home station arm extending outwardly from said hose housing, said spray hose disposable from said housing interior of said hose housing through said home station arm.

7. The brush system as recited in claim 1, further comprising a supply hose disposed in communication with the pressurized water supply.

8. The brush system as recited in claim 7, further comprising a hose connecting conduit disposed in fluid communication between said supply hose and said spray hose.

9. The brush system as recited in claim 1, wherein said at least one brush includes a brush handle, a spray head mounted to said brush handle and a brush coupling extending from said brush handle dimensioned and configured to removably attach said at least one brush to said brush coupling assembly via a coupling socket.

10. The brush system as recited in claim 1, further comprising a plurality of brushes, wherein each of said plurality of brushes includes a brush handle, a spray head mounted to said brush handle and a brush coupling extending from said brush handle dimensioned and configured to removably attach each of said plurality of brushes separately to said brush coupling assembly via a coupling socket.

11. The brush system as recited in claim 10, wherein each of said plurality of brushes further comprises a brush release button on said brush handle thereof to facilitate removable attachment and detachment of each of said plurality of brushes from said brush coupling assembly.

12. The brush system as recited in claim 10, wherein at least one of said plurality of brushes comprises a scrub brush.

13. The brush system as recited in claim 12, wherein said scrub brush comprises a plurality of brush bristles extending from said spray head.

14. The brush system as recited in claim 10, wherein at least one of said plurality of brushes comprises a bottle brush.

15. The brush system as recited in claim 14, wherein said bottle brush includes a brush opening in said brush head.

16. The brush system as recited in claim 10, wherein a spray concentrator is deployable onto a portion of said spray head of each of said plurality of brushes to concentrate a water spray discharged from said spray head into a narrower stream.

17. The brush system as recited in claim 10, wherein said spray head of each of said plurality of brushes comprises a spray control button thereon to allow selective control between a flaccid water spray discharged from said spray head or a forceful water spray discharged from said spray head.

18. A brush system operable with a pressurized water supply comprising:

a hose housing;

a hose spool mounted in a rotational disposition in said hose housing;

a spray hose storable in a wound disposition on said hose spool;

a brush coupling assembly disposed in fluid communication with one end of said spray hose, wherein said brush coupling assembly includes a shutoff valve on a distal end of said spray hose, a coupling socket disposed in fluid communication with said shutoff valve, a socket cup disposed in said coupling socket and at least one socket opening e ding through said socket cup, said at least one brush configured for releasable attachment via said coupling socket;

a plurality of brushes removably attachable to said brush coupling assembly, wherein at least one of said plurality of brushes comprises a scrub brush and at least one of said plurality of brushes comprises a bottle brush; and a flow control valve disposed in fluid communication with an opposite end of said spray hose and the pressurized water supply.

19. A brush system operable with a pressurized water supply comprising:

a hose housing;

a hose spool mounted in a rotational disposition in said hose housing;

a spray hose storable in a wound disposition on said hose spool;

a brush coupling assembly disposed in fluid communication with one end of said spray hose, wherein said brush coupling assembly includes a shutoff valve on a distal end of said spray hose, a coupling socket disposed in fluid communication with said shutoff valve, a socket cup disposed in said coupling socket and at least one socket opening extending through said socket cup, said at least one brush configured for releasable attachment via said coupling socket;

a plurality of brushes removably attachable to said brush coupling assembly, wherein each of said plurality of brushes includes a brush handle and a spray head mounted to said brush handle;

said spray head of each of said plurality of brushes comprises a spray control button thereon to allow selective control between a flaccid water spray discharged from said spray head or a forceful water spray discharged from said spray head; and a flow control valve disposed in fluid communication with an opposite end of said spray hose and the pressurized water supply.

* * * * *